US011097292B2

(12) United States Patent
Chevalier et al.

(10) Patent No.: US 11,097,292 B2
(45) Date of Patent: Aug. 24, 2021

(54) FLUID PRODUCT DISPENSING HEAD AND ASSEMBLY FOR MOULDING SUCH A HEAD

(71) Applicant: APTAR FRANCE SAS, Le Neubourg (FR)

(72) Inventors: Frédéric Chevalier, La Neuville du Bosc (FR); Frank Plessis, Fouqueville (FR)

(73) Assignee: APTAR FRANCE SAS, Le Neubourg (FR)

( * ) Notice: Subject to any disclaimer, the term of this patent is extended or adjusted under 35 U.S.C. 154(b) by 0 days.

(21) Appl. No.: 16/610,110

(22) PCT Filed: May 3, 2018

(86) PCT No.: PCT/FR2018/051104
§ 371 (c)(1),
(2) Date: Nov. 1, 2019

(87) PCT Pub. No.: WO2018/203004
PCT Pub. Date: Nov. 8, 2018

(65) Prior Publication Data
US 2020/0078804 A1    Mar. 12, 2020

(30) Foreign Application Priority Data

May 4, 2017 (FR) ..................................... 1753950

(51) Int. Cl.
*B05B 1/34* (2006.01)
*B05B 11/00* (2006.01)
(Continued)

(52) U.S. Cl.
CPC ........ *B05B 1/3442* (2013.01); *B05B 11/3047* (2013.01); *B05B 1/3436* (2013.01);
(Continued)

(58) Field of Classification Search
CPC ... B05B 1/3442; B05B 11/3047; B05B 15/40; B05B 15/30; B05B 1/3436;
(Continued)

(56) References Cited

U.S. PATENT DOCUMENTS 4,225,060 A    9/1980 Kutik et al.
4,530,449 A *  7/1985 Nozawa ............... B05B 11/3063
                                                    222/189.11
(Continued)

FOREIGN PATENT DOCUMENTS

EP    0 117 898 A2    9/1984
EP    2 767 348 A1    8/2014
(Continued)

OTHER PUBLICATIONS

International Preliminary Report on Patentability issued from the International Bureau in counterpart International Application No. PCT/FR2018/051127, dated Nov. 7, 2019.
(Continued)

*Primary Examiner* — Frederick C Nicolas
(74) *Attorney, Agent, or Firm* — Sughrue Mion, PLLC

(57) ABSTRACT

A fluid dispenser head having a single-piece head body (1) forming an axial inlet well (12) suitable for connecting to a dispenser member (D), such as a pump or a valve; and a transverse feed duct (13) that extends from the axial inlet well (12). The dispenser head also has a dispenser orifice (21) in fluid communication with the transverse feed duct (13). A filter (F) is situated in the axial inlet well (12) and/or in the transverse feed duct (13).

18 Claims, 2 Drawing Sheets

(51) Int. Cl.
  *B05B 15/40* (2018.01)
  *B05B 15/30* (2018.01)
  *B29C 45/00* (2006.01)

(52) U.S. Cl.
  CPC ....... *B05B 11/0005* (2013.01); *B05B 11/3014* (2013.01); *B05B 11/3025* (2013.01); *B05B 11/3038* (2013.01); *B05B 11/3074* (2013.01); *B05B 15/30* (2018.02); *B05B 15/40* (2018.02); *B29C 45/00* (2013.01)

(58) Field of Classification Search
  CPC ............. B05B 11/0005; B05B 11/3014; B05B 11/3025; B05B 11/3074; B05B 11/3038; B29C 45/00
  See application file for complete search history.

(56) References Cited

U.S. PATENT DOCUMENTS

| | | | | |
|---|---|---|---|---|
| 5,730,332 A | * | 3/1998 | Zimmerhackel | B05B 7/0068 222/148 |
| 6,837,401 B2 | * | 1/2005 | Groys | B65D 83/20 222/189.11 |
| 7,658,304 B2 | * | 2/2010 | Groys | B65D 83/75 222/189.11 |
| 7,731,062 B2 | | 6/2010 | Groys | |

FOREIGN PATENT DOCUMENTS

| | | |
|---|---|---|
| FR | 2 935 362 A1 | 3/2010 |
| FR | 2 994 866 A1 | 3/2014 |
| FR | 3 005 431 A1 | 11/2014 |
| JP | 04-134456 U | 12/1992 |
| WO | 94/12406 A1 | 6/1994 |
| WO | 2009/130461 A1 | 10/2009 |
| WO | 2010/131042 A1 | 11/2010 |
| WO | 2011/064584 A1 | 6/2011 |

OTHER PUBLICATIONS

International Search Report of PCT/FR2018/051104 dated Aug. 31, 2018 [PCT/ISA/210].

* cited by examiner

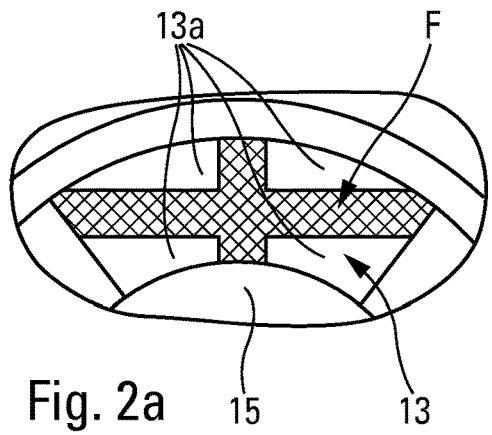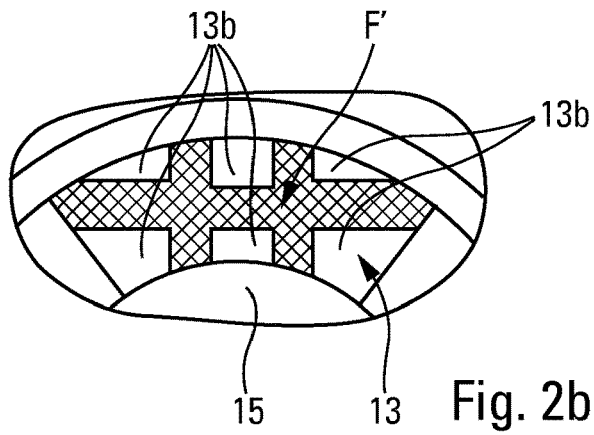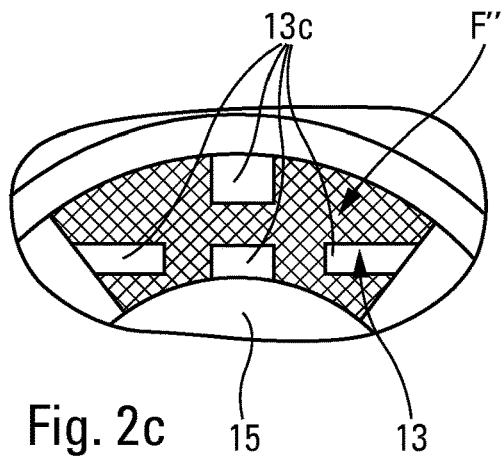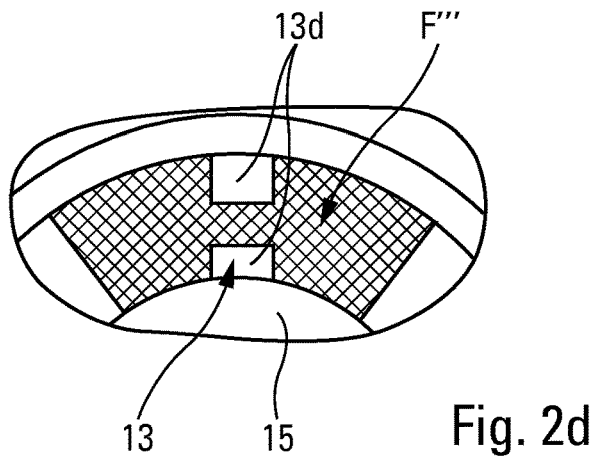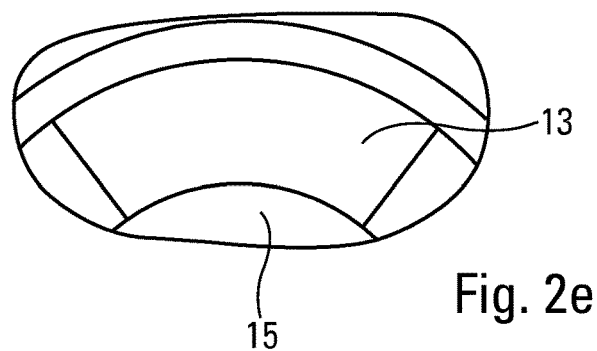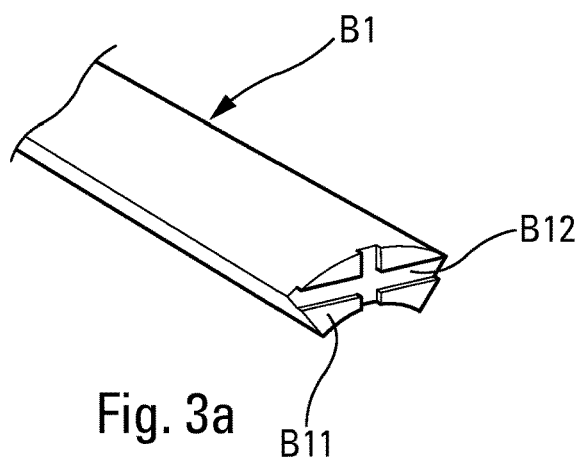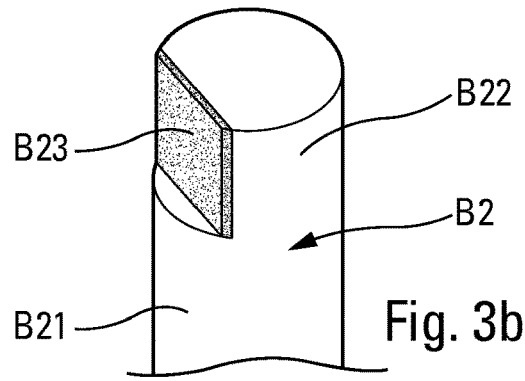

ent of the filter remain in the inlet well and do not risk blocking or reducing the flow section of the feed duct. In a practical embodiment, the transverse feed duct defines an inlet, the axial inlet well forming a flat in which the inlet of the transverse feed duct is formed. In this configuration, the filter may extend in the plane of the flat at the inlet of the transverse feed duct.

FLUID PRODUCT DISPENSING HEAD AND ASSEMBLY FOR MOULDING SUCH A HEAD

CROSS REFERENCE TO RELATED APPLICATIONS

This application is a National Stage of International Application No. PCT/FR2018/051104, filed May 3, 2018, claiming priority to French Patent Application No. 1753950, filed May 4, 2017.

FIELD OF INVENTION

The present invention relates to a fluid dispenser head comprising a single-piece body forming an axial inlet well that is suitable for connecting to a dispenser member, such as a pump or a valve, and a transverse feed duct that extends from the axial inlet well. The dispenser head also comprises a dispenser orifice in fluid communication with the transverse feed duct. By way of example, such a head may be in the form of a pusher that is actuatable by means of one or more fingers of a hand. Advantageous fields of application of the present invention are the fields of perfumery, cosmetics, and pharmacy, without excluding other fields.

BACKGROUND

In the prior art, document FR 2 994 866 A1 is known, which describes a dispenser head in which swirl channels are formed in a frustoconical surface and open out at an angle in the swirl chamber that defines a cylindrical side wall. More precisely, a nozzle forming the spray orifice and the cylindrical wall is engaged around a pin forming an end wall and the frustoconical surface in which the swirl channels are formed. Thus, the flows of fluid coming from the swirl channels penetrate into the swirl chamber, passing through the swirl chamber towards the spray orifice. It should be observed that the fluid flow sections in that prior-art head are particularly small relative to a conventional head. The diameter of the dispenser orifice is about 150 micrometers (μm), whereas for a conventional head, it is generally around 300 μm.

In empirical manner, a problem has sometimes been found of the nozzle becoming blocked by particles of various kinds and of origin that is often unknown, particularly with heads having a dispenser orifice that is small. One simple solution would be to place a particle filter at the inlet of the dip tube. Another solution would be to filter the fluid before filling the reservoir of the dispenser.

CERTAIN OBJECTS OF THE INVENTION

An object of the present invention is to find another solution that leads to very little, or almost no change, to the dispenser, to its manufacture, or to its packaging line.

To do this, the present invention makes provision for a filter, e.g. in the form of a grid, to be situated either in the axial inlet well and/or in the transverse feed duct. The filter is thus positioned as close as possible to the dispenser orifice. Advantageously, the filter is formed by the single-piece body of the head that also forms the axial inlet well and the transverse feed duct. Forming the filter integrally in the single-piece body makes it possible to avoid a mounting or assembly operation. Furthermore, forming the filter does not generate any drawbacks in the molding operation. Preferably, the filter is situated at the junction between the axial inlet well and the transverse feed duct. Thus, the particles retained by the filter remain in the inlet well and do not risk blocking or reducing the flow section of the feed duct. In a practical embodiment, the transverse feed duct defines an inlet, the axial inlet well forming a flat in which the inlet of the transverse feed duct is formed. In this configuration, the filter may extend in the plane of the flat at the inlet of the transverse feed duct.

In other aspects of the invention, the spray head further comprises a connection sleeve that is suitable for receiving an actuator rod of a dispenser member, such as a pump or a valve, and a nozzle that co-operates with the single-piece body to define a swirl chamber upstream from the spray orifice, and swirl channels that open out transversally into the swirl chamber so as to spray the fluid through the dispenser orifice. These are conventional characteristics for a spray head in the fields of perfumery, cosmetics, and pharmacy.

The present invention also defines a fluid dispenser comprising a reservoir, a pump mounted on the reservoir, and a dispenser head, as define above, and associated with the pump.

The present invention also defines a molding assembly for molding the dispenser head of the invention, the assembly comprising a well pin for forming the axial inlet well and a duct pin for forming the transverse feed duct, the duct pin including an end wall that is formed with a recessed indentation, the well pin including a lateral contact wall against which the end wall comes into contact so as to define between them a network of open channels suitable for receiving an injection of a melt of plastics material so as to form the filter. Thus, the only difference with a conventional molding assembly is that the end wall of the duct pin forms a recessed indentation that corresponds to the filter. The molding operation remains strictly the same. Advantageously, the lateral contact wall may be plane, and is formed by a flexible coating that is deformable by the end wall so that the network of open channels is well isolated.

The spirit of the invention resides in incorporating a filter in the dispenser head, and even molding it integrally with the body of the head. Locating the filter at the outlet of the inlet well, i.e. at the inlet of the feed duct, makes it possible to block particles in the inlet well, which is of volume that is much greater than the volume of the feed duct.

BRIEF DESCRIPTION OF THE DRAWINGS

The invention is described more fully below with reference to the accompanying drawings, which show an embodiment of the invention by way of non-limiting example, together with a variant.

In the figures:

FIG. 2a is a view on a much larger scale showing a detail A of FIG. 1;

FIGS. 2b, 2c, and 2d are views showing variant embodiments of FIG. 2a;

FIG. 2e is a view similar to the views in FIGS. 2a to 2d for a prior-art dispenser head;

FIG. 3a is a diagrammatic perspective view of a duct pin; and

FIG. 3b is a diagrammatic perspective view of a well pin that is suitable for co-operating with the FIG. 3a duct pin in order to mold the filter of the invention.

DETAILED DESCRIPTION OF NON-LIMITING EMBODIMENTS

Figure 1:
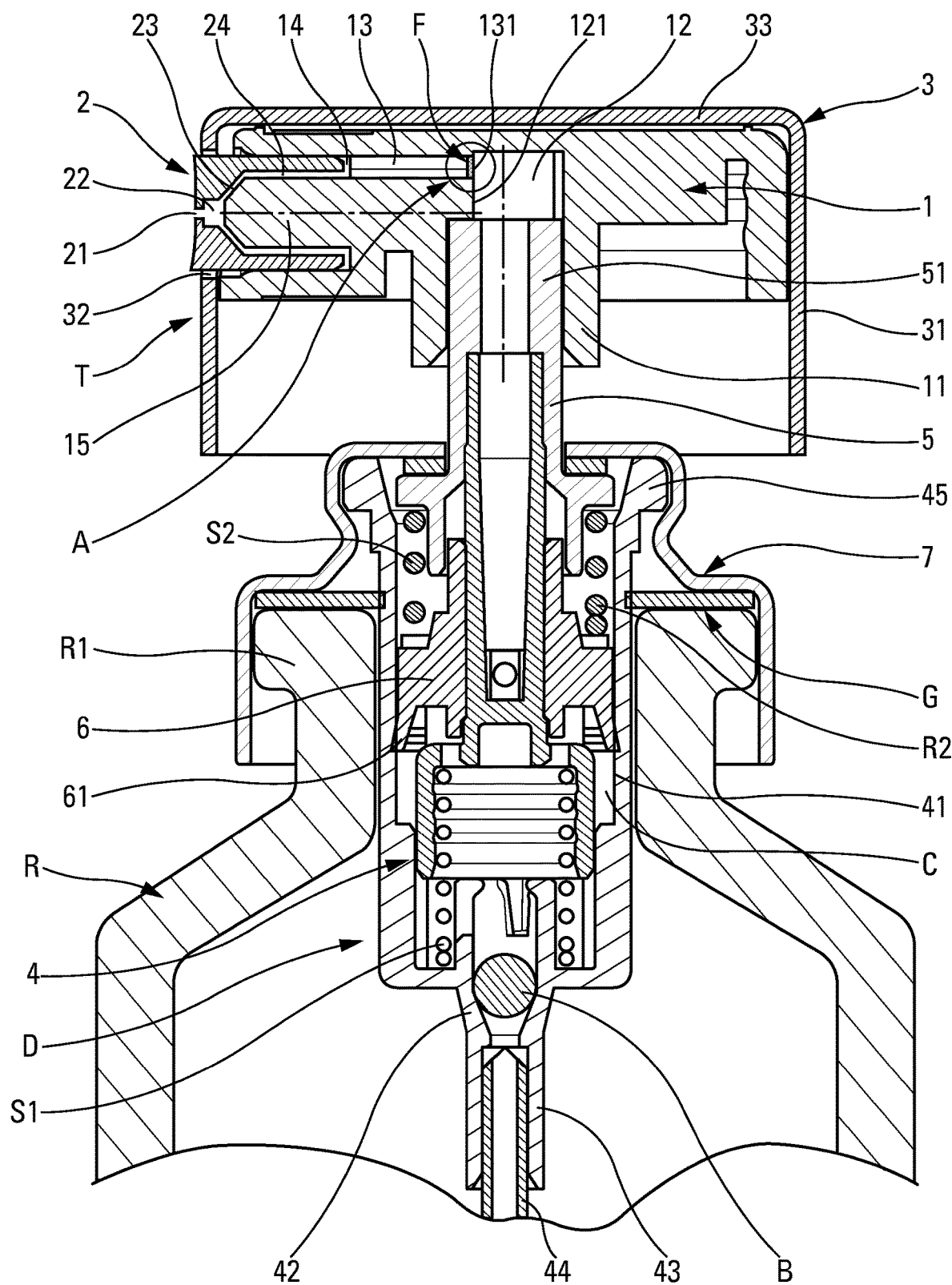
FIG. 1 is a vertical section view through a fluid dispenser of the present invention.

The dispenser head T of the present invention may be used at the outlet of any fluid dispenser member D, e.g. a pump, a valve, a squeezable reservoir, etc. The dispenser head of the invention finds an advantageous application as a pusher that is manually actuatable by means of one or more fingers. The pusher may be incorporated in a pump or a valve, or preferably it may be fitted on the free end of an actuator rod forming an internal outlet duct. The dispenser head is for conveying fluid.

In FIG. 1, the fluid dispenser member D is a pre-compression pump. The pump presents a substantially-conventional general configuration with a pump body 4 that defines, in its bottom portion, a seat for a ball B, and a tube holder 43 for a dip tube 44. In its top portion, the pump body 4 forms a collar 45 that projects radially outwards. The collar 45 may be used for fastening a fastener system 7 that may be in the form of a crimping ring, for example. Naturally, it is possible to envisage other forms of fastener system 7 for associating with the pump body 4. The fastener system 7 is fitted with a neck gasket G making it possible to provide sealing with the neck R1 of a fluid reservoir R. The pump body 4 internally defines a cylindrical slide cylinder 41 in which there slides, in leaktight manner, a piston 6 that is provided with a sealing lip 61. The piston 6 is mounted on an actuator rod 5 that is urged into its rest position by a return spring S1. In order to create pre-compression, the piston 6 is urged by a pre-compression spring S2. The piston 6 is movably mounted on the actuator rod 5 in such a manner as to be capable of uncovering an outlet passage for the compressed fluid in the pump chamber C. In other words, the piston 6 performs a function of outlet valve, by releasing an outlet passage when the pressure inside the pump chamber C reaches a predetermined value. The pre-compression spring S2 urges the piston 6 into the closed position of the outlet valve. Thus, the piston 6 can move over the actuator rod 5 only when the pressure inside the chamber C is sufficient to compress the pre-compression spring S2.

Thus, by pressing the actuator rod 5 into the pump body 4 against the spring S1, the volume of the pump chamber C decreases, thus putting the fluid that it contains under pressure. When the pressure reaches a predetermined value, the outlet valve opens and the fluid under pressure is forced through the actuator rod 5 so as to reach the pusher that incorporates a dispenser head of the invention.

In a non-limiting embodiment of the invention, the head T includes a head body 1 that may be made by injection molding an appropriate plastics material. The head body 1 may be made as a single piece. In conventional manner, it comprises a connection sleeve 11 for fitting on the free end 51 of the actuator rod 5. The connection sleeve 11 leads directly into an axial inlet well 12 that advantageously forms a plane side wall or a flat 121. The axial inlet well 12 is connected to a transverse feed duct 13 having an inlet 131 that is situated in the flat 121. While the connection sleeve 11 and the axial inlet well 12 extend substantially in line with the actuator rod 5, the transverse feed duct 13 extends perpendicularly to the actuator rod 5. More precisely, the inlet 131 is situated at the top of the flat 121. As can be seen in FIGS. 2a, 2b, and 2c, the cross-section of the transverse feed duct 13 is in the shape of a segment of a cylinder with two long edges that are curved, and two end edges that are rectilinear, but oriented in diverging manner. The transverse feed duct 13 opens out into a housing 14 that is preferably cylindrical and that opens out laterally onto the periphery of the head body 1. The housing 14 contains a core 15 that projects outwards from the housing 14. Thus, an annular space is formed inside the housing 14 around the core 15.

It should be observed that the axial inlet well 12 and the transverse feed duct 13 convey the fluid, to the exclusion of any air or gas.

In conventional manner, a nozzle 2 is fitted and inserted in stationary manner inside the housing 14 around the core 15, as can be seen in FIG. 1. The nozzle forms a dispenser orifice 21 through which the fluid is dispensed, e.g. in the form of spray of small droplets. The diameter of the dispenser orifice is preferably less than or equal to 150 µm. In a variant, the nozzle may form an array of 2 to 100 dispenser orifices having a diameter lying in the range 1 µm to 100 µm. Upstream from the orifice 21, the nozzle 2 co-operates with the core 15 to form a swirl chamber 22 and swirl channels 23 that open out transversally into the swirl chamber 22. The swirl channels 23 are connected to the transverse feed duct 13 via passages 24 that are formed between the nozzle 2 and the core 15. This is a conventional design for a nozzle mounted on a core in the fields of perfumery, cosmetics, and pharmacy.

The dispenser head T may also be provided with a covering hoop 3 that sheathes the head body 1 in attractive manner, leaving the nozzle 2 visible. The hoop 3 comprises: a side skirt 31 in which a slot 32 is formed for the nozzle 2; and a top bearing wall 33 on which the user can press by means of a finger, in general an index finger.

In the invention, the dispenser head T, and more particularly its body 1, is provided with a filter F upstream from the housing 14 of the nozzle 2. The filter F is intended to have the fluid pass therethrough. The filter is situated either in the axial inlet well 12, or in the transverse feed duct 13. In FIG. 1, the filter F is situated at the junction between the axial inlet well 12 and the transverse feed duct 13. In greater detail, the filter is situated at the inlet 131 of the transverse feed duct 13. Advantageously, the filter F is situated in the duct 131 without projecting into the well 12. Preferably, the upstream face of the filter F is arranged flush with the flat 121.

In an advantageous embodiment of the invention, the filter F forms an integral part of the single-piece head body 1. In other words, the filter F is molded integrally with the well 12 and the duct 13. FIG. 2a shows the FIG. 1 filter F. It is in the form of a grid or a cross that segments the cross-section of the duct 13 into four sectors 13a. Thus, certain particles coming from the well 12 are stopped by the filter F.

FIG. 2b shows a variant embodiment for the filter. The filter F' is also in the form of a grid, but said grid segments the cross-section of the duct 13 into six sectors 13b. Thus, the filter F' can block smaller particles than the FIG. 2a filter F.

FIG. 2c shows another variant embodiment for the filter. The filter F'' presents only four sectors 13c. Thus, the filter F'' is even more selective.

FIG. 2d shows still another variant embodiment for the filter. The filter F''' presents only two small sectors 13d. Thus, the filter F''' is very selective.

FIG. 2e shows a conventional transverse feed duct 13 that does not have any filter. It is clear that the duct 13 allows much bigger particles to pass than with the filters F, F', F'', and F'''.

Purely by way of indication, the flow section of the feed duct 13 may be about 0.9 square millimeters ($mm^2$). The combined total of the FIG. 2a sectors 13a thus lies in the range about 0.4 $mm^2$ to about 0.5 $mm^2$. The combined total of the FIG. 2b sectors 13b lies in the range about 0.3 $mm^2$ to about 0.4 $mm^2$. The combined total of the FIG. 2c sectors 13c lies in the range about 0.2 $mm^2$ to about 0.25 $mm^2$, and the combined total of the FIG. 2d sectors 13d lies in the range about 0.1 mm² to about 0.15 mm².

FIGS. 3a and 3b are very diagrammatic views showing core molding pins B1 and B2 that form part of a molding assembly for molding the head body 1.

The pin B1 is a duct pin with which the transverse feed duct 13 is formed. The duct pin B1 includes an end wall B11 that is formed with a recessed indentation B12 in the form of a grid or a cross corresponding to the filter F.

The pin B2 is a well pin with which the axial inlet well 12 is formed. The well pin B2 comprises a bottom section B21 for molding the inside of the connection sleeve 11, and a top section B22 for molding the inside walls of the axial inlet well 12. The top section B22 of the pin B2 includes a lateral contact wall B23 that is advantageously plane. The lateral contact wall B23 is advantageously formed with, or by, a flexible coating that is deformable.

During molding, the end wall B11 of the duct pin B1 is brought into bearing contact against the lateral contact wall B23 of the well pin B2. Thus, the recessed indentation B12 is covered by the lateral contact wall B23, thereby creating between them a network of open channels suitable for receiving an injection of a melt of plastics material so as to form the filter F. By means of the flexible coating of the lateral contact wall B23, the end wall B11 can come into intimate contact, deforming the flexible coating a little so that the network of open channels is well isolated. Furthermore, the flexible coating makes it possible to reduce wear of the end wall B11. In addition, it is easier to replace the flexible coating than to rework the end wall B11.

With such a dispenser or spray head, the risks of blocking at the nozzle or at the transverse feed duct are reduced considerably.

The invention claimed is:

1. A fluid dispenser head comprising a single-piece head body forming:
   an axial inlet well that is suitable for connecting to a dispenser member; and
   a transverse feed duct that extends from the axial inlet well;
   the dispenser head also comprising a dispenser orifice in fluid communication with the transverse feed duct and configured so that fluid coming from the dispenser member passes through the axial inlet well and the transverse feed duct so as to reach the dispenser orifice;
   wherein a filter (F; F'; F''; F''') is situated in at least one of the axial inlet well or in the transverse feed duct, the fluid passing through the filter (F; F'; F''; F''');
   wherein the dispenser head comprises a nozzle forming the dispenser orifice comprising an array of 2 to 100 dispensing orifices having a diameter lying in the range of 1 to 100 µm; and
   wherein the filter is formed by the single-piece head body.

2. The dispenser head according to claim 1, wherein the filter (F; F'; F''; F''') is situated at the junction between the axial inlet well and the transverse feed duct.

3. The dispenser head according to any claim 1, wherein the filter (F; F'; F''; F''') is in the form of a grid.

4. The dispenser head according to claim 1, wherein the transverse feed duct opens out into a housing, and the nozzle forming the dispenser orifice is engaged in the housing.

5. The fluid dispenser head according to claim 1, wherein the diameter of the dispenser orifice is less than or equal to 150 µm.

6. A fluid dispenser comprising a reservoir, a pump mounted on the reservoir, and a dispenser head according to claim 1 and associated with the pump.

7. The fluid dispenser head according to claim 1, wherein the dispenser member is a pump or a valve.

8. A fluid dispenser head comprising a single-piece head body forming:
   an axial inlet well that is suitable for connecting to a dispenser member; and
   a transverse feed duct that extends from the axial inlet well;
   the dispenser head also comprising a dispenser orifice in fluid communication with the transverse feed duct and configured so that fluid coming from the dispenser member passes through the axial inlet well and the transverse feed duct so as to reach the dispenser orifice;
   wherein a filter is situated in at least one of the axial inlet well or in the transverse feed duct, the fluid passing through the filter;
   wherein the dispenser head comprises a nozzle forming the dispenser orifice comprising an array of 2 to 100 dispensing orifices having a diameter lying in the range of 1 to 100 µm;
   wherein the transverse feed duct defines an inlet, the axial inlet well forming a flat in which the inlet of the transverse feed duct is formed; and
   wherein the filter extends in the plane of the flat at the inlet of the transverse feed duct.

9. A fluid dispenser head comprising a single-piece head body forming:
   an axial inlet well that is suitable for connecting to a dispenser member; and
   a transverse feed duct that extends from the axial inlet well;
   the dispenser head also comprising a dispenser orifice in fluid communication with the transverse feed duct, and configured so that fluid coming from the dispenser member passes through the axial inlet well and the transverse feed duct so as to reach the dispenser orifice;
   wherein a filter is situated in at least one of the axial inlet well or the transverse feed duct, the fluid passing through the filter;
   wherein the transverse feed duct defines an inlet, the axial inlet well forming a flat in which the inlet of the transverse feed duct is formed; and
   wherein the filter extends in the plane of the flat at the inlet of the transverse feed duct.

10. The dispenser head according to claim 9, wherein the filter is formed by the single-piece body.

11. The dispenser head according to claim 9, wherein the filter is situated at the junction between the axial inlet well and the transverse feed duct.

12. The dispenser head according to claim 9, wherein the filter is in the form of a grid.

13. The dispenser head according to claim 9, wherein the transverse feed duct opens out into a housing, and a nozzle forming the dispenser orifice is engaged in the housing.

14. The fluid dispenser head according to claim 9, wherein the diameter of the dispenser orifice is less than or equal to 150 µm.

15. A fluid dispenser head comprising a single-piece head body forming:
   an axial inlet well that is suitable for connecting to a dispenser member; and
   a transverse feed duct that extends from the axial inlet well;
   the dispenser head also comprising a dispenser orifice in fluid communication with the transverse feed duct, and configured so that fluid coming from the dispenser member passes through the axial inlet well and the transverse feed duct so as to reach the dispenser orifice;

wherein a filter is situated in at least one of the axial inlet well or the transverse feed duct, the fluid passing through the filter;

the dispenser head further comprising a connection sleeve configured to receive an actuator rod of the dispenser member, and a nozzle that co-operates with the single-piece body to define a swirl chamber upstream from the dispenser orifice, and swirl channels that open out transversally into the swirl chamber so as to spray the fluid through the dispenser orifice.

16. The fluid dispenser head according to claim 15, wherein the dispenser member is a pump or a valve.

17. A molding assembly for molding a dispenser head; wherein:

the dispenser head comprises a single-piece head body forming:

an axial inlet well that is suitable for connecting to a dispenser member; and a transverse feed duct that extends from the axial inlet well;

the dispenser head also comprising a dispenser orifice in fluid communication with the transverse feed duct, and configured so that fluid coming from the dispenser member passes through the axial inlet well and the transverse feed duct so as to reach the dispenser orifice;

wherein a filter is situated in at least one of the axial inlet well or the transverse feed duct, the fluid passing through the filter;

the molding assembly comprising a well pin for forming the axial inlet well and a duct pin for forming the transverse feed duct, the duct pin including an end wall that is formed with a recessed indentation, the well pin including a lateral contact wall against which the end wall comes into contact so as to define between the lateral contact wall and the end wall a network of open channels suitable for receiving an injection of a melt of plastics material so as to form the filter (F; F'; F''; F''').

18. The molding assembly according to claim 17, wherein the lateral contact wall is advantageously plane, and is formed by a flexible coating that is deformable by the end wall so that the network of open channels is well isolated.

* * * * *